Oct. 25, 1960 S. H. MAGID 2,957,792
METHOD OF HEAT SEALING EDGE BINDINGS AROUND
OPENINGS IN HOLLOW THERMOPLASTIC BODIES
Filed April 19, 1954 2 Sheets-Sheet 1
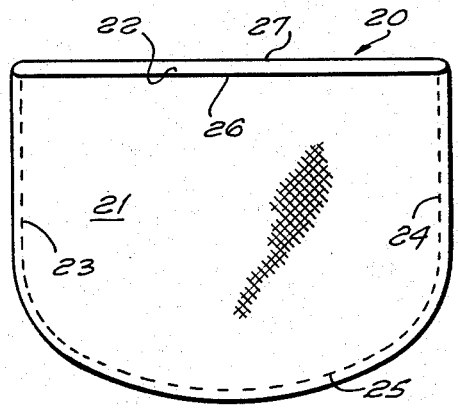
FIG.1.
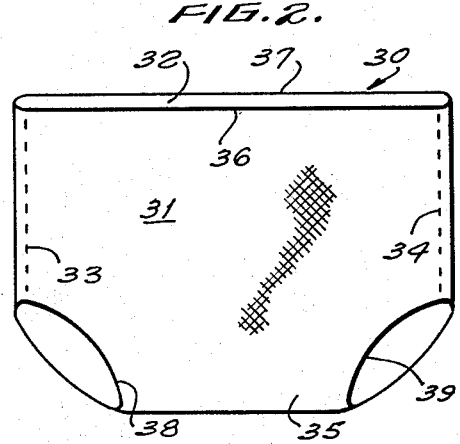
FIG.2.
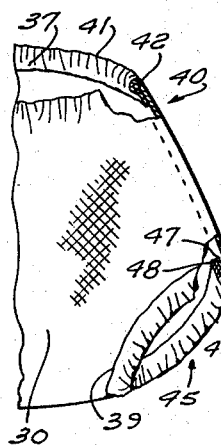
FIG.3.
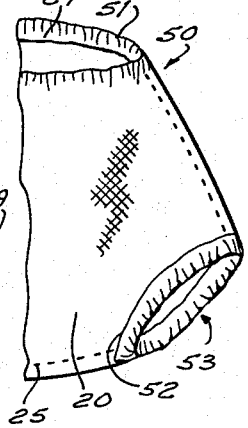
FIG.4.
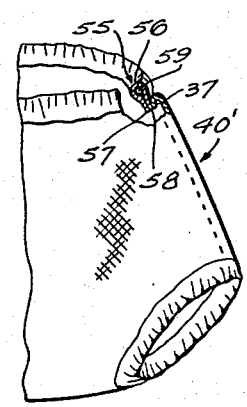
FIG.5.
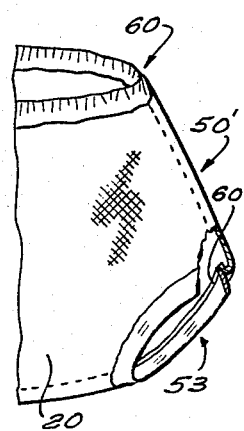
FIG.6.
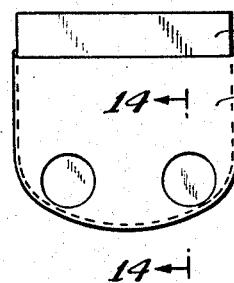
FIG.13.
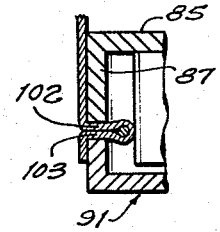
FIG.12.
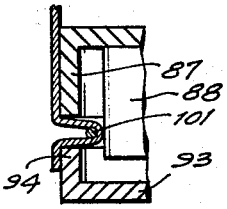
FIG.11.
FIG.14.
INVENTOR.
SIDNEY H. MAGID
BY
Percy Freeman
ATTORNEY

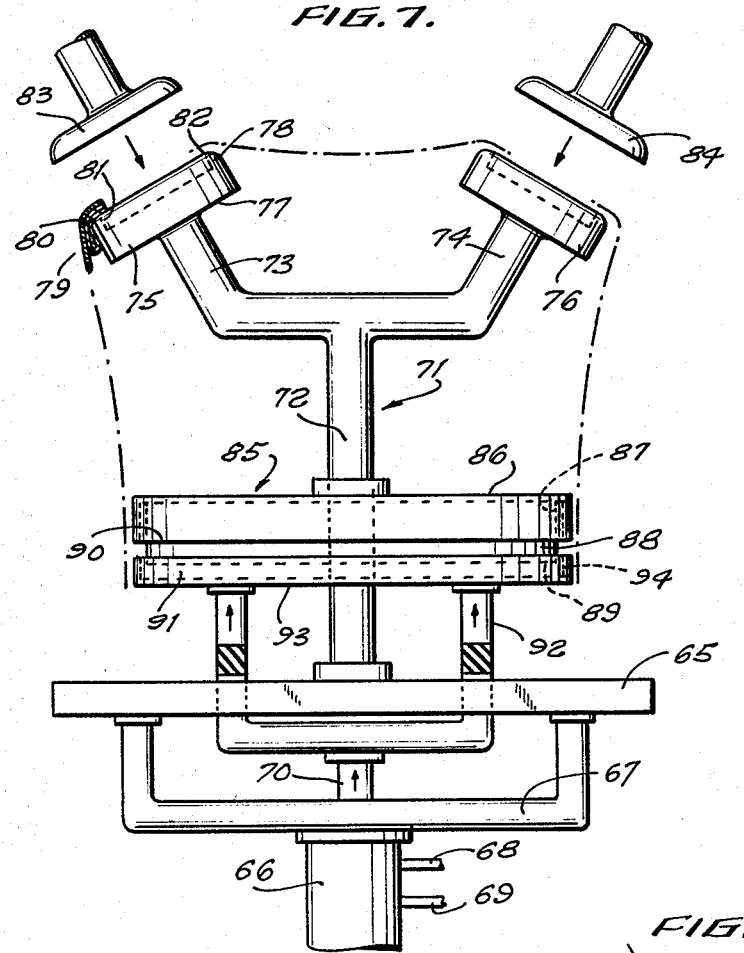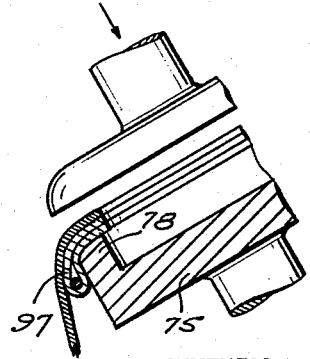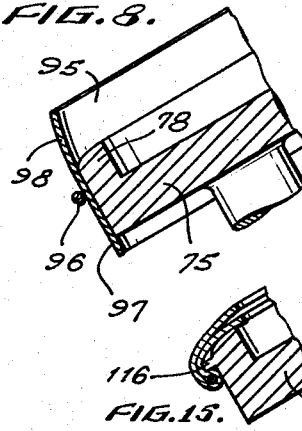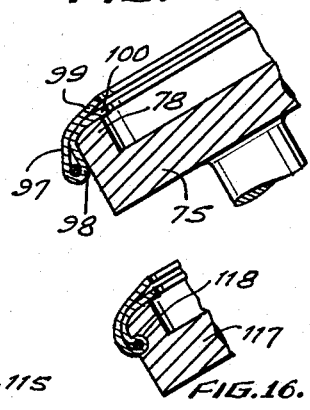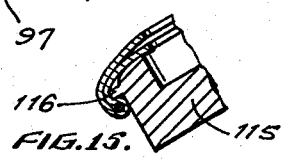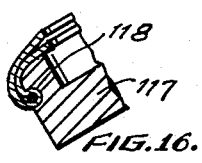

United States Patent Office 2,957,792
Patented Oct. 25, 1960

2,957,792

METHOD OF HEAT SEALING EDGE BINDINGS AROUND OPENINGS IN HOLLOW THERMOPLASTIC BODIES

Sidney H. Magid, Morrisville, Pa.
(110 Elm Drive, Roslyn (E. Hills), N.Y.)

Filed Apr. 19, 1954, Ser. No. 424,150

4 Claims. (Cl. 154—85)

This invention relates generally to garments, and is particularly directed to baby pants, including novel methods for manufacturing the same.

This application is a continuation-in-part of my copending application Serial No. 367,485, filed July 13, 1953, now Patent No. 2,768,107.

An important feature of the present invention is the provision of an improved baby pants construction, and method for manufacturing the same, in which an annular edging or cuff is secured about the leg openings and, if desired, also about the waist opening of a pants body, so that the secured portions of edging and pants body are substantially unruffled with respect to each other. Thus, a novel edging or cuff is provided which is adapted to enclose a core of elastic or inelastic material, for drawing the edging snugly about the person of the wearer. Obviously, this will provide a highly desirable bloomer effect, affording ample space for a relative bulky diaper and serving to entirely enclose the latter.

By the present invention, it is also possible to employ edging materials of different colors and quality to achieve a variety of aesthetic effects; and, the edging material may also be selected for its desirable wearing qualities, such as resistance to abrasion and repeated flexing or ruffling and unruffling. In this manner, the areas of critical wear may be enhanced in durability as well as appearance and comfort.

Another important feature of the present invention is the provision of methods of manufacturing baby pants of the type described above, which methods are particularly well adapted for use with thermoplastic sheet material, or material of which some of the components are thermoplastic, and the securement or uniting of such materials by heat sealing procedures. Further, the method of the present invention permits of forming baby pants from either a one-piece pants body blank having a seamless crotch, or a two-piece pants body having a seamed crotch. In addition, the securement of the binding edge, in practice of the present invention, is highly efficient and advantageous, in that the pants body and edging material immediately adjacent to the secured portion is scored or removed simultaneously with the securing operation, thus leaving a minimum of excess material at the weld to minimize the possibility of gathering dirt. The secured portions or seams extend over an extremely limited area, and there is practically no material remaining within the finished garment likely to irritate a baby's skin.

Other objects and advantages of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

Fig. 1 is a front elevational view showing a two-piece pants body adapted to be employed in practice of the present invention.

Fig. 2 is a front elevational view showing a one-piece pants body adapted to be employed in practice of the present invention.

Fig. 3 is a partial, perspective view showing baby pants constructed from a one-piece pants body in accordance with the present invention, with parts broken away and in section for clarity of understanding.

Fig. 4 is a partial, perspective view showing baby pants similar to those of Fig. 3, but constructed of a two-piece pants body.

Fig. 5 is a partial, perspective view, partly broken away, showing a slightly modified form of baby pants constructed from a one-piece pants body in accordance with the present invention.

Fig. 6 is a partial, perspective view showing baby pants somewhat similar to those of Fig. 5, but formed of a two-piece pants body, and with a modified cuff secured to the leg opening.

Fig. 7 is a front elevational view showing apparatus of the present invention for manufacturing baby pants, a pants body being illustrated in dot-and-dash outline and partly in section.

Fig. 8 is a partial, sectional view, showing one supporting die of the apparatus of Fig. 7, and illustrating an early step in the method of manufacturing baby pants according to the present invention.

Fig. 9 is a view similar to Fig. 8 illustrating an intermediate step in the manufacture of baby pants.

Fig. 10 is a view similar to Figs. 8 and 9, showing also an operating or mating die, and illustrating a later step in the method.

Fig. 11 is a partial, sectional view showing the waist supporting die, and its mating or coacting die, of the apparatus of Fig. 7, and illustrating an early step in the method of manufacture.

Fig. 12 is a partial, sectional view similar to Fig. 11 showing a later step in the method of the present invention.

Fig. 13 is an elevational view showing a modification of the form used for holding the pants preparatory to attaching the cuffs.

Fig. 14 is a fragmentary sectional view taken along line 14—14 on Fig. 13 and showing the coacting die.

Figs. 15 and 16 are fragmentary sectional views showing modified forms of dies used in making baby pants according to the present invention.

Referring now more particularly to the drawings, and specifically to Figs. 1 and 2 thereof, the pants body, generally designated 20, of Fig. 1, includes front and rear walls 21 and 22, preferably fabricated of flexible, thermoplastic sheet material, or material of which at least part is thermoplastic, and secured together, as by heat sealing, along the sides 23 and 24 and bottom 25. Thus, the top edge portions 26 and 27 are unsealed to provide a waist opening. The front and rear walls 21 and 22 may be identical in configuration to provide a symmetrical waist opening; or, one wall, preferably the rear wall, may be larger to provide an asymmetrical waist opening and fuller seat. This may also be accomplished with a two-piece pants body having identical front and rear walls in a manner which will be described hereinafter.

In Fig. 2 is shown a slightly modified form of pants body, generally designated 30, which may also be employed in the practice of the present invention, and which is formed of a single blank of flexible, preferably thermoplastic sheet material. The blank is cut and folded to form front and rear walls 31 and 32 which are secured together along their sides, preferably by heat sealing at 33 and 34, the bottom or crotch portion 35 being seamless in this type of pants body. The top edge portions 36 and 37 of the front and rear pants body walls remain unsecured to define the waist opening, as described in connection with Fig. 1; and, the original one-piece blank is cut away along the lines 38 and 39 to form leg openings when the sides are secured together. The disposition of the cutouts 38 and 39 is preferably such that the rear wall 32 is larger than the front wall 31 to provide ample seat room for the wearer.

In Fig. 3 is shown a finished pair of baby pants, generally designated 40, constructed from the pants body 30. The upper edge portions 36 and 37 of the front and rear walls 31 and 32 are folded inwardly and secured, preferably by heat sealing, to the adjacent pants body portion to define a tunnel or hem 41 extending about the waist opening. A core 42, preferably an elastic annulus, extends through the tunnel or hem 41 to resiliently contract the waist opening. Of course, the core 42 may be inelastic and have its ends free for drawstring operation.

Secured about each of the leg openings 38 and 39, only one being shown in Fig. 3, is an annular edging or binding, generally designated 45, and which is preferably formed of flexible, thermoplastic sheet material, and of generally cylindrical or endless configuration prior to securement to the pants body, as will appear in greater detail hereinafter. Of course, the binding 45 may be also formed of an elongated strip of sheet material, if desired. As seen in Fig. 3, the binding sheet is folded longitudinally or circumferentially, as the case may be, to define a bight portion 46 with flaps 47 and 48 in face-to-face abutting engagement. Further, the outer flap 47 has its outer surface in facing engagement with the outer surface of the pants body 30 adjacent to the bounding edge of the pants opening 39, which bounding edge is substantially coincident with the edges of the flaps 47 and 48. In this relation, the flaps 47 and 48 are secured to each other, and to the pants body, preferably by heat-sealing means, as will be more fully described hereinafter. It will be observed that the flaps 47 and 48 and the bight portion 46 combine to define an annular tunnel, through which extends a core 49 for contracting the leg opening. While the core 49 is preferably an elastic annulus, it is appreciated that the core may be inelastic, and may have ends either secured within the edging 45 or extending outwardly therefrom for manipulation as desired.

In Fig. 4 is shown a pair of baby pants, generally designated 50, constructed of the pants body 20. The waist opening is hemmed, as at 51, by folding the upper wall edge portions 26 and 27 inwardly and securing the same to the adjacent wall portions, in the same manner as described in connection with Fig. 3. In this form of baby pants construction, it is necessary to provide the leg opening 52 subsequent to formation of the pants body, and it is preferred to position the leg openings somewhat forwardly so as to provide a full seat, all as more fully described hereinafter.

In Fig. 5 is shown another form of baby pants construction, generally designated 40', which is substantially the same as the baby pants 40 of Fig. 3, except that an annular edging or binding 55 is secured about the waist opening. More particularly, the edging 55 is preferably formed of flexible thermoplastic sheet material of endless or cylindrical configuration, but may also be formed of an elongated sheet of thermoplastic material. The sheet or annulus is folded longitudinally or circumferentially, as the case may be, to provide a bight portion 56, and inner and outer facing engaging flaps 57 and 58. The outer surface of the outer flap 58 is arranged in facing engagement with the outer surface of the pants body 30 adjacent to the waist opening, and the edges of the flaps 57 and 58, and the waist opening edge 37 are all substantially coincident and secured together in their facing relation, preferably by heat sealing means. As described in connection with the binding edge 45 of Fig. 3, the binding edge 55 defines an annular tunnel for containing a core 59, which is preferably but not necessarily an elastic annulus.

In Fig. 6 is shown still another slightly modified form of baby pants construction 50' which is made from the pants body 20. The baby pants 50' are substantially the same as the baby pants 50 of Fig. 4, except that an annular edging or binding 60 is provided about the waist opening, in substantially the same manner as the edging 55 in Fig. 5. A further exception is that a modification of the cuff structure is shown wherein the annular edging is of web elastic or other equivalent elastic material which is provided at least along one edge with a margin 60' of thermoplastic material suitable for heat sealing to the pants body at the leg openings.

The apparatus for manufacturing baby pants of the type described above is illustrated more or less schematically in Fig. 7, wherein 65 designates a fixed base plate, below which is mounted a hydraulic cylinder 66 by means of the bracket 67. The cylinder 66 is provided with fluid inlet and outlet connections 68 and 69 for effecting vertical reciprocation of the rod 70, for purposes appearing presently.

Mounted above the base plate 65 is a frame, generally designated 71, which includes a standard 72 having upwardly and outwardly extending bifurcated arms 73 and 74, upon the distal ends of which are mounted supporting dies 75 and 76, respectively. As the supporting dies are substantially identical in construction, a detailed description of one will suffice. It will be noted that the supporting die 75 is generally cup-shaped in configuration, and includes a generally circular bottom wall 77 and an upstanding, annular peripheral wall 78 on the bottom wall. The outer surface 79 of the annular wall 78 is rounded, as at 80, so as to curve inwardly until it meets the inner cylindrical wall surface 81, thereby defining a generally circular line of intersection 82 between the inner and outer wall surfaces. Operating dies 83 and 84, which may be flat, circular plates, or other suitable shape, are arranged in facing relation with respect to the supporting dies 75 and 76, respectively, and are mounted for movement toward and away from their respective mating die.

Fixed on the standard 72 is a generally inverted cup-shaped waist supporting die 85 which includes a circular top wall 86 and a depending peripheral, annular wall 87. Concentrically of and spacedly within the waist supporting die 85 is a generally cylindrical wall 88 which is secured to the top wall 86 and has its lower edge 89 depending below the lower edge 90 of the peripheral wall 87. An operating or mating waist die 91 is spacedly circumposed about the standard 72 below the waist supporting die 85 and rigidly secured to the rod 70 by means of the bracket 92. The operating die 91 is generally cup-shaped in configuration and includes a bottom wall 93 secured to the bracket 92, and an upstanding, annular peripheral wall 94 in edge to edge facing relation with respect to the depending wall 87 of the supporting die 85.

A suitable heating means (not shown) is employed to provide conductive or dielectric heating, as desired, between the pairs of coacting dies.

In the preferred method of manufacture, a tube or annulus 95 of flexible, thermoplastic sheet material is circumposed about each of the supporting dies 75 and 76, and an annular elastic core 96 is arranged about the cylinder 95 to hold the latter on the supporting die. The lower portion 97 of the tube 99 is then folded over the elastic core 96 into facing engagement with the upper tubular portion 98, and the tube edge portions 99 and 100 are folded together into overlying relation with respect to the annular die wall 78. Thus, the annulus 95 is folded circumferentially on itself and over the supporting die 75. While it is preferred to employ an endless or tubular sheet 95, it will be understood that an elongated strip may also be wrapped around the supported die in longitudinally folded relation with its edge portions overlying the die, in substantially the same manner as described above.

The pants body, either of the types shown in Figs. 1 and 2, will then be turned inside out and disposed in inverted condition over the supporting dies 75 and 76 and the frame 71. If the pants body 30 is employed, the leg openings will be arranged over the supporting dies 75 and 76 with the leg opening edged portions overlying and engaging the inturned flap 99 of the tube 95. When the pants body 20 is used, the desired locations of the leg openings are arranged over the supporting dies 75 and 76, overlying the tube flaps 99. In either case, the regions of the leg openings are maintained in smooth, distended condition overlying the flaps 99 and 100 of the edging 95.

The waist opening of the pants body is circumposed about the walls 87 and 94 of the supporting die 85 and operating die 91, respectively (see Fig. 11), and a cord 101, preferably but not necessarily an elastic annulus, is circumposed about the waist opening of the pants body so as to draw the adjacent pants body portion inwardly into engagement with the inner cylinder 88.

The operating die 91 is then moved upwards to the position of Fig. 12, and, preferably simultaneously therewith, the operating dies 83 and 84 are moved toward their respective coacting dies 75 and 76. Under the heating action between the coacting dies 75 and 83, the tube layers 99 and 100, and the adjacent pants body portion will be plasticized and welded together. Further, any thermoplastic material of the edging or pants body disposed inwardly of the inner surface 81 of the wall 78 will be simultaneously scored and removed to form a smooth unobstructed leg opening. Of course, the same action occurs under heat and pressure of the mating of coacting dies 76 and 84.

Preferably simultaneously with the sealing or uniting of the leg bindings, and scoring or cutting away of the material within the leg opening, the operating die 91 is moved upwardly by the rod 70 to the position of Fig. 12, whereby heat and pressure between the coacting or mating dies 85 and 91 serve to plasticize and unite the pants body portions 102 and 103, and thus hem the waist opening. Of course, the securement of the tubular edging or binding about the waist opening could also be effected in the same manner as illustrated in connection with the leg openings.

In Figs. 13 and 14 is shown an alternative coacting die assembly for practicing the methods and producing the articles of the invention. With this assembly, a previously prepared pants body 110 similar to body 20, of two like sheets constituting front and rear walls; or like the body 30 which is folded of a single sheet to constitute front and back walls, is placed on a form comprising a thin metal plate 111, as seen in Figs. 13 and 14. In this case, the pants body is imperforate and the leg openings are formed when the coacting die 112, which carries the annular leg edging 113 as described with reference to Figs. 7, 8, 9 and 10, is brought toward the pants body 110 to unite the edging 113 by heat and pressure to the area of the body which is to form the edge of the leg openings. The operating die 112 is formed to score and prepare for removal, the discs of body material to produce the leg openings. Obviously, both leg openings are formed simultaneously and so also are the respective annular edgings or cuffs affixed simultaneously.

In Figs. 15 and 16 are shown modified forms of operating dies. The die 115 in Fig. 15 has a shouldered annulus 116 circumjacent the die, while the die 117 is provided with an annular groove 118. In both these cases, the shouldered annulus 116 and the annular groove 118 serve the same general purpose of providing an abutment for better support of the bight and elastic core of the cuff or annular edging which is being attached to the pants body.

Further, while the present invention has been illustrated and described in connection with endless tubular edgings, it is fully appreciated that split or elongated tubular edgings may also be provided, as in the case of the diaper type or open front baby pants. In such construction, it is only necessary to properly align the edging strips with the pants body upon securement thereto. Further, pairs of edging strips having mating separable fasteners secured thereto may also be secured to the pants body to permit opening and closing of the pants.

For convenience of nomenclature, the term "thermoplastic" shall be considered to mean any type or kind of sheet or strip material which is thermoplastic in part, at least at that portion of its surface or body which is to be united by heat and pressure to another body or to itself.

From the foregoing, it is seen that the present invention provides baby pants construction, and methods for manufacturing the same, which fully accomplish their intended objects, and which are well adapted to meet practical conditions of manufacture and use.

The foregoing is illustrative of preferred forms of this invention, and it will be understood that these preferred forms may be modified and other forms may be provided within the broad spirit of the invention and the broad scope of the claims.

Having thus described my invention, what I claim as new and desire to secure by Letters Patent is:

1. The method of making a pair of baby pants from a preformed imperforate pants body of thermoplastic sheet material which has a front wall and a back wall, and a pair of separate annular edgings of thermoplastic material which are to be secured to said body to surround leg openings which are to be made therein, said method comprising inserting a thin metal plate into a preformed pants body between the front and back walls thereof to isolate them from each other and to support them in flat condition, mounting upon another support that part of the annular edgings which are to be secured to the main body portion, moving at least one of said supports toward the other to bring said parts of the annular edging and said body portion into face-to-face engagement in the area of the intended leg openings, and then uniting said edgings and the main body portion to each other by applying heat and pressure, and simultaneously forming a score line, and then removing the surplus material circumscribed by said score line of contact.

2. The method of making an article from a preformed hollow body of thermoplastic sheet material which has a front wall and a back wall, and from a pair of separate annular edgings of thermoplastic material which are to be secured to the walls of the body to surround openings which are to be made therethrough; said method comprising inserting a plate into a preformed hollow body between the front and back walls thereof to isolate them from each other and to support them in flat condition, mounting upon another support that part of the annular edgings which are to be secured to the article, moving at least one of said supports toward the other to bring said parts of the annular edging and said article into face-to-face engagement in the area of the intended openings, and then uniting said edgings and the article to each other by applying heat and pressure, and simultaneously forming a score line, and then removing the surplus material circumscribed by said score line of contact.

3. The method of making an article from a preformed hollow body of thermoplastic sheet material which has a front wall and a back wall, and from a pair of separate annular edgings of thermoplastic material which are to be secured to the walls of the body to surround openings, said method comprising inserting a plate into a preformed hollow body between the front and back walls thereof to isolate them from each other and to support them in flat condition, mounting upon another support that part of the annular edgings which are to be secured to the article around openings therein, moving at least one of said supports toward the other to bring said parts of the annular edging and said article into face-to-face engagement, and then uniting said edgings and the article to each other by applying heat and pressure.

4. The method of making an article from a preformed hollow body of thermoplastic sheet material which has a front wall and a back wall, and from a pair of separate annular edgings of thermoplastic material which are to be secured to the walls of said body to surround openings, said method comprising inserting a plate into a preformed hollow body between the front and back walls thereof to isolate them from each other and to support them in flat condition, said tubular body having openings through at least one of its walls, mounting upon another support that part of the annular edgings which are to be secured to the article around said openings, moving at least one of said supports toward the other to bring said parts of the annular edging and said article into face-to-face engagement in the area of the rim of said openings, and then uniting said edgings and the article to each other by applying heat and pressure.

References Cited in the file of this patent

UNITED STATES PATENTS

| | | |
|---|---|---|
| 1,397,579 | Guinzburg | Nov. 22, 1921 |
| 2,252,992 | Steiner | Apr. 19, 1941 |
| 2,342,187 | Gardner | Feb. 22, 1944 |
| 2,450,631 | Buchler | Oct. 5, 1948 |
| 2,466,643 | Magid | Apr. 5, 1949 |
| 2,468,445 | Hurst | Apr. 26, 1949 |
| 2,490,451 | Magid | Dec. 6, 1949 |
| 2,575,164 | Donovan | Nov. 13, 1951 |
| 2,618,266 | De Leone | Nov. 18, 1952 |
| 2,650,182 | Green | Aug. 25, 1953 |
| 2,658,551 | Bender | Nov. 10, 1953 |
| 2,681,296 | Dobbs et al. | June 15, 1954 |
| 2,686,556 | Gerber et al. | Aug. 17, 1954 |
| 2,697,057 | Senger et al. | Dec. 14, 1954 |
| 2,748,048 | Russell | May 29, 1956 |
| 2,768,107 | Magid | Oct. 23, 1956 |

FOREIGN PATENTS

| | | |
|---|---|---|
| 658,244 | Great Britain | Oct. 3, 1951 |